United States Patent [19]

Nixon

[11] Patent Number: 4,466,779
[45] Date of Patent: Aug. 21, 1984

[54] CHECK VALVE WITH INJECTOR

[76] Inventor: Jeddy D. Nixon, 1706 S. Gessner Rd., Houston, Tex. 77063

[21] Appl. No.: 430,975

[22] Filed: Sep. 30, 1982

[51] Int. Cl.$^3$ .............................................. F04B 9/02
[52] U.S. Cl. .................................... 417/229; 137/99; 417/375
[58] Field of Search ............... 417/229, 245, 375, 398; 137/99; 222/129.2, 133

[56] References Cited

U.S. PATENT DOCUMENTS

| | | | |
|---|---|---|---|
| 3,356,101 | 12/1967 | Tacchi | 222/129.2 |
| 3,481,318 | 12/1969 | Sparrow et al. | 137/99 X |
| 3,866,621 | 2/1975 | Greene, Jr. | 137/99 |

Primary Examiner—Leonard E. Smith
Attorney, Agent, or Firm—Neal J. Mosely

[57] ABSTRACT

A combined check valve and fluid injector includes a valve body with an inlet, outlet and valve seat. A pump chamber is positioned at the outlet side of the valve seat and has a fluid inlet. A hollow piston member moves in the pump chamber and the hollow connection to the valve body. A ball check valve closing the valve seat is provided with a spring loaded valve follower. A hollow actuating rod extends from the valve follower into the hollow piston with a lost motion connection and has openings for discharge of fluid in the valve body. The piston is limited in movement by an adjustable stop member and has a check valve which opens on upward movement. Opening of the valve moves the rod and piston to pump fluid from the pump chamber into the fluid flowing through the valve body. A counter, or the like, may be provided for operation by piston movement for measuring frequency or distance of movement. Certain modifications may direct the fluid outside the chamber rather than into the valve body. Alternatively, a rubber plug sealed to the rod and to a supporting sleeve presses the rod against the valve follower to function as both spring and seal. The measuring device may also be a continuously functioning counter with an external pinion gear rotatable to move the counter; a rack member engages the pinion; and a reduction gear between the pinion and counter permits measuring the extent as well as the frequency of movement of the check valve.

16 Claims, 3 Drawing Figures

CHECK VALVE WITH INJECTOR

BACKGROUND OF THE INVENTION

1. Field of the Invention

This invention relates to new and useful improvements in measuring and regulating devices for oil wells and more particularly to a combined valve and injector.

2. Brief Description of the Prior Art

It is common practice in the oil fields to have a number of wells producing to a common tank or battery of tanks through a common flow line. Also, injectors are commonly used for introducing chemicals or lubricant into the production from various types of wells. All conventional injection pumps do not inject treating chemical compounds on a fluid or gas production ratio. The conventional injectors pump fluid as long as the pump jack runs (and not producing), or if a flowing well (with a gas, air, or electric powered pump) stops flowing. This causes waste of expensive treating compounds by oversupplying the volume actually produced. This oversupply will travel to the tank battery in a slug and is not properly mixed or may be proportionately incorrect for proper treatment of the production from the well. Improper proportioning can necessitate the heating and rolling of the tanks at the battery before a saleable product is produced. This is an expensive operation.

The common practice in checking production is for the person in charge of gauging or pumping to measure the fluid levels in these tanks each morning, or at least daily according to schedule. This determines the amount of total production from the numerous wells producing to this tank or battery, but not the production from each individual well. On gas producing leases, the gas production from multiple wells is usually metered at a common "Meter Run" with the number of wells being collectively metered at this more or less central position.

When the daily gauge or meter reading at these common (for multiple wells) collection points shows a deficiency, there is a malfunction at one or more of the numerous wells being monitored at this central point. The "gauger" must then determine which well or wells are malfunctioning. In the past, it has been necessary to produce each individual well into a portable test unit to determine individual well malfunctions. This could be time consuming, as long as 24 hr. per well, which could be very expensive in operational costs as well as lost production. The other alternative has been the installation of individual flow meters on the separate wells which is also very expensive.

SUMMARY OF THE INVENTION

One of the objects of this invention is to provide a new and improved mechanism for injecting chemicals and/or lubricant into the production of oil and gas wells.

Another object of the invention is to provide an improved check valve having features for injecting fluids and/or for measuring the frequency and/or extent of operation of oil and gas wells.

Another object of the invention is to provide a check valve having an injector pump mechanism operated by the opening of the valve.

Still another object of the invention is to provide a check valve having an injector pump mechanism operated by the opening of the valve and optionally having a counter or other suitable measuring device operated by the opening of the valve.

Yet another object of the invention is to provide a check valve having an injector pump mechanism, and optionally a counter or other suitable measuring device, operated by the opening of the valve and having a sealing plug which functions as the spring for closing the check valve.

A further object of the invention is to provide a check valve having counter or other suitable measuring device operated by the opening of the valve wherein the valve operates a counter by a rack and pinion mechanism or an electric proximity switch which permits measurement of the extent of valve movement as well as the frequency of movement.

Other objects of the invention will become apparent from time to time throughout the specification and claims as hereinafter related.

The foregoing and other objects of the invention are accomplished by a combined check valve and fluid injector which includes a valve body with an inlet, outlet and valve seat. A pump chamber is positioned at the outlet side of the valve seat and has a fluid inlet. A hollow piston member moves in the pump chamber and the hollow connection to the valve body. A ball check valve closing the valve seat is provided with a spring loaded valve follower.

A hollow actuating rod extends from the valve follower into the hollow piston with a lost motion connection and has openings for discharge of fluid in the valve body. The piston is limited in movement by an adjustable stop member and has a check valve which opens on upward movement. Opening of the valve moves the rod and piston to pump fluid from the pump chamber into the fluid flowing through the valve body.

A counter, or the like, may be provided for operation by piston movement for measuring frequency or distance of movement. Certain modifications may direct the fluid outside the chamber rather than into the valve body. Alternatively, a rubber plug sealed to the rod and to a supporting sleeve presses the rod against the valve follower to function as both spring and seal.

The measuring device may also be a continuously functioning counter with an external pinion gear rotatable to move the counter; a rack member engages the pinion; and a reduction gear between the pinion and counter permits measuring the extent as well as the frequency of movement of the check valve.

DESCRIPTION OF A PREFERRED EMBODIMENT

Figure 1:
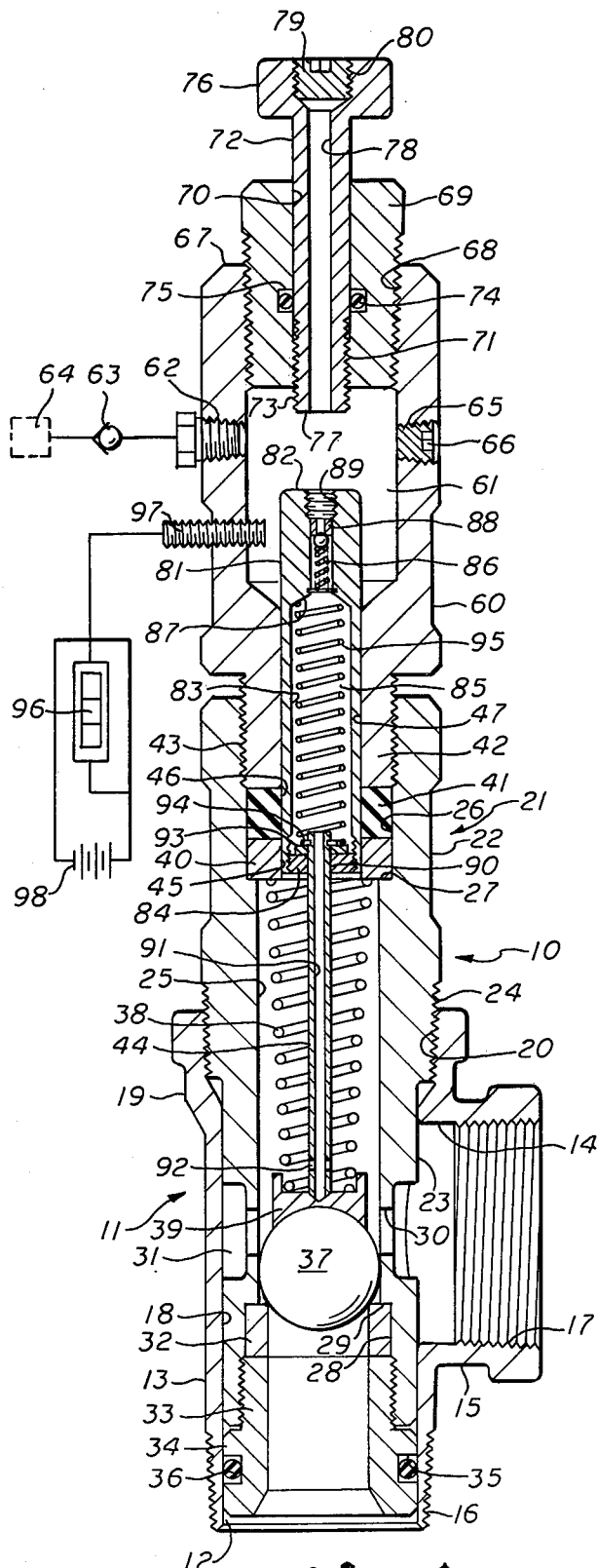
FIG. 1 is a view in longitudinal central section of a preferred embodiment of a combined check valve and injector.

Referring to the drawings by numerals of reference, and more particularly to FIG. 1, there is shown an improved valve and injector assembly 10 for connection in well head flow lines. Valve assembly 10 comprises a hollow tee shaped valve body 11 (preferably a common street tee) having an inlet opening 12 on one side 13 of the tee and an outlet opening 14 on the stem 15 of the tee.

Valve body 11 has external male threads 16 on the inlet side 13 and female threads 17 at the outlet portion 15. Valve body 11 has a smooth bore 18 extending from inlet end 13 to the opposite side 19 of the tee. The opposite side 19 of the tee has a threaded counterbore 20.

A valve assembly 21 consists of tubular body 22 which has a cylindrical portion 23 which has a sliding fit in bore 18 and an enlarged threaded portion 24 secured in counterbore 20. Tubular body 22 has a smooth bore 25 with a first counterbore 26 and shoulder 27 at one end and a second counterbore 28 and shoulder 29 at the other end. Opening 30 in the body 22 opens into annular groove 31 and communicates with outlet opening 14.

Valve seat member 32 fits in counterbore 28 and is held against shoulder 29 by threaded sleeve member 33, which has a flange 34 with annular groove 35 and sealing O-ring 36. Ball valve 37 has a loose sliding fit in bore 25 and seats against valve seat member 32. Ball valve 37 is urged toward closed position by spring 38 which presses against ball valve follower 39. At the other end of body 22, a disc 40 rests on shoulder 27. A rubber packing 41 is positioned in counterbore 26 against disc 40.

A hollow pump chamber body 60 has a pump chamber 61 with a threaded inlet 62 for connection to a check valve 63 (shown schematically) which is connected to a source 64 of fluid, e.g. lubricant or chemicals. Hollow body 60 has a threaded opening 65 closed by a plug 66. The outer end 67 of hollow body 60 has a threaded opening 68 in which there is positioned a threaded plug member 69. Passage 70 extends through plug member 69 and has a threaded end portion 71.

An adjustable stop member 72 extends through passage 70 and has a threaded end portion 73 which is adjustably secured in threaded passage portion 71. O-ring 74 in annular groove 75 seals passage 70 against leakage. The end 76 of stop member 72 is of a shape, e.g. hexagonal, or surface configuration, e.g. knurled, which facilitates turning to adjust the position of the end 77 in chamber 61. A passage 78 extends through stop member 72 which is closed by plug 79 in enlarged threaded end portion 80.

Hollow body 60 has a guide extension 42 threadedly secured as at 43 in the end of tubular body 22 and having a longitudinal bore 47. Disc 40 and packing 41 have openings substantially the same size as bore 47. Piston 81 is positioned for sliding movement in openings 45, 46 and 47 and has its upper end 82 extending into pump chamber 61. Piston 81 is sealed against fluid leakage by packing 41 which is compressed around it.

Piston 81 is cylindrical in shape and has an enlarged bore 83 at one end which is closed by threaded disc member 84 defining chamber 85 therein. Piston 81 has a small bore 86 at the other and and a shoulder 87 froming one end of chamber 85. A spring operated check valve assembly 88, of conventional design, is secured in passage or bore 86. The end of bore 86 is threaded as at 89 for optional installation of a sealing plug.

Disc member 84 has a central opening 90 through which the valve actuated rod 44 extends. Rod 44 has a longitudinal passage 91 extending through its entire length which opens at its upper end into chamber 85 and at its lower end through openings 92 into the valve body on the outlet side of valve seat 32. The upper end of rod 44 has a shoulder on which washer 93 rests and is secured in place by snap ring 94. Spring 95 extends between shoulder 87 and washer 93 to hold the same in engagement with disc 84. Spring 95 operates as a conventional overtravel mechanism permitting movement of valve 37 and rod 44 after piston 81 has reached its limit of movement.

An optional feature provided with the valve and injector is a counter mechanism for measuring the frequency, and in some cases the extent, of valve movement. Counter 96 is an electrically operated counter which is operated by a conventional electric proximity swirch or detector 97 threaded in the wall of tubular body 60. The circuit for counter 96 is powered by battery 98 or any other suitable source of electricity.

OPERATION

In operation, this valve is installed in the flow line from an oil or gas well. When ball valve 37 is forced from seat 32 by a pressure surge or flow, the movement of rod 44 moves the piston 81 into chamber 61. The extent of movement of piston 61 is determined by the adjustment of adjustable stop member 72. The injection fluid, e.g. lubricant or treating chemicals, from source 64 enters chamber 61 under gravity feed.

When piston 81 is moved into chamber 61, the fluid is prevented by check valve 63 from flowing back through the inlet line. The movement of the piston 81 therefore causes the fluid to flow past check valve 88 through chamber 85 and passage 91 in rod 44 into the outlet side of the valve body 11 to mix with the oil or gas flowing therein.

Each upward movement of check valve 37 is therefore operable to move piston 81 a selected distance and inject a selected amount of fluid from pump chamber 61 into the outlet side of valve body 11. The amount of piston movement is selected by the adjustment of stop member 72. When the piston 81 engages stop member 72, further movement is prevented but the valve 37 and rod 44 may move further by means of the overtravel spring 95 as described above.

When the flow is interrrupted or ceases, the ball valve 37 is returned to its seat by spring 38 along with hollow rod 44. The upward and downward movement of piston 81 by valve 37 also cause the counter 96 to register another count. This well check does not meter or gauge the production of each well but gives an early indication of failure or malfunction by the counter readings. The apparatus is quite inexpensive relative to metering and gauging devices. As each individual well establishes its own "pulse rate", this number can be recorded daily and any fluctuation will indicate a possible malfunction.

This injector mechanism can be easily modified to pump fluid to another point instead of mixing with the fluid flowing through the check valve body 11. A threaded plug (not shown) may be inserted in threaded opening 89 of piston 81. Then, either or both of plugs 66 and 79 may be removed and flow lines connected from those openings to the point where the fluid is to be pumped.

AN ALTERNATE EMBODIMENT

Figure 2:
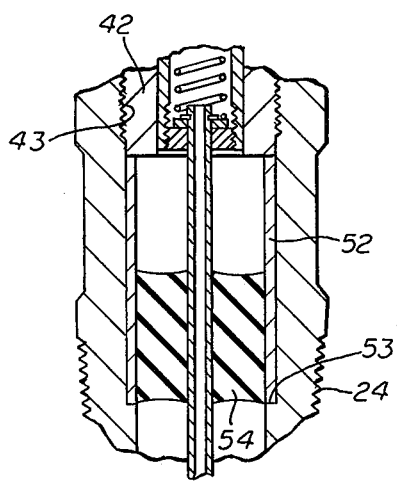
FIG. 2 is a partial sectional view of the check valve showing an alternate sealing arrangement for the hollow valve stem which also functions as a valve spring.

In FIG. 2, there is shown an alternate embodiment in which a different seal is used for hollow rod 44. Sleeve 52 is held against shoulder 53 by guide plug 42. Rubber seal plug 54 is sealed to hollow rod 44 and to the inner surface of sleeve 52. Rubber seal plug 54 combines the sealing function of packing 41 and the spring function of spring 38. Plug 54 is positioned to press rod 44 to close valve 37. Plug 54 can optionally be sealed between sleeve 52 and piston 81, instead of rod 44, if desired. The other parts of the valve and injector assembly are as described in FIG. 1. The manner of operation is the same as that of FIG. 1, except that plug 54 performs a dual function as described above.

ANOTHER EMBODIMENT

Figure 3:
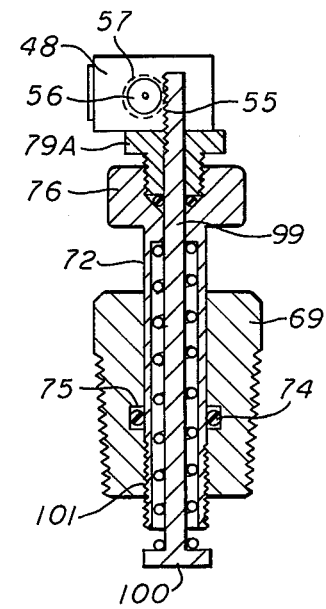
FIG. 3 is a partial sectional view of still another embodiment in which the check valve operates a counter by means of a rack and pinion drive which permits measurement of the extent as well as the frequency of valve operation.

In FIG. 3, there is shown another embodiment in which stop member 72 has a support member 79a at its upper end on which the counter mechanism 48 is positioned. Counter 48 is operated through a 2:1 reduction gear 57 by a pinion gear 56. Operating rod 99 is slidably supported in support member 79a and has an enlarged lower end 100 engaged by a return spring 101. The upper end of rod member 99 is a rack 55 which operates pinion gear 56 on engagement of the rod member by piston 81. In this embodiment, the movement of hollow rod 44 and piston 81 up and down operates pinion 56 to register the extent of movement.

While this invention has been described fully and completely with special emphasis on three preferred embodiments, it should be understood that, within the scope of the appended claims, this invention may be practiced otherwise than as specifically set forth herein.

I claim:

1. A check valve and injector for well head flow lines comprising
   a hollow valve body having an inlet opening and an outlet opening,
   a valve seat member in said valve body,
   a hollow body defining a pump chamber supported on said valve body and opening into the outlet side thereof and having an inlet operable to be connected to a source of injection fluid,
   a hollow piston sealed against leakage in and moveable longitudinally of the opening between said valve body and said pump chamber and having an opening into said valve body,
   a spring loaded ball valve in said valve body cooperable with said valve seat member,
   means interconnecting said ball valve and said piston for conjoint movement and including lost motion means permitting overtravel of said ball valve relative to said piston,
   a check valve in said hollow piston permitting flow through said piston in the direction of said valve body, and
   opening movement of said ball valve being operable to move said piston to pump fluid from said pumping chamber into the outlet side of said valve body to mix with fluid flowing therethrough.

2. A check valve and injector according to claim 1 including
   a check valve controlling flow of fluid through said inlet into said pump chamber and preventing backflow therethrough.

3. A check valve and injector according to claim 1 including
   an adjustable stop member in said hollow body engagable with said piston to limit the extent of movement thereof to determine the amount of fluid pumped thereby.

4. A check valve and injector according to claim 1 in which
   said sealing means comprises a retaining disc fitted in one end of said valve body and having an aperture through which said hollow rod extends,
   a packing surrounding said hollow rod compressed against said retaining disc, and
   said spring means comprising a spring positioned between said valve follower and said retaining disc.

5. A check valve and injector according to claim 1 in which
   said valve body comprises a tee shaped valve body with male threads at one end of the tee and female threads at the other end of the tee and the stem of the body,
   a tubular valve assembly having one end slidably fitting the tee of said valve body and the other end extending outside said valve body and having an intermediate portion with male threads secured in the female threads of the other end of said valve body tee,
   said one end of said valve assembly being internally threaded and having said valve seat member positioned therein,
   a threaded sleeve member secured in said one end of said valve assembly securing said valve seat member in place,
   said tubular valve assembly having openings communicating with said valve body outlet, and
   said tubular body being threadedly secured in the other end of said tubular valve assembly.

6. A check valve according to claim 5 including
   a continuously functioning counter having an external pinion gear operable upon rotation in either direction to advance the counter,
   a rod member having a gear-rack shaped upper end portion engaging said pinion,
   a reduction gear between said pinion and said counter whereby said counter advances an amount measuring the extent as well as the frequency of movement of said check valve,
   said counter being supported on the end of said hollow body adjacent said stop member, and
   said rod member being movably supported in said stop member for actuation by said piston upon engagement thereby.

7. A check valve and injector according to claim 1 including
   a counter actuated upon opening movement of said ball valve by movement of said piston.

8. A check valve and injector according to claim 7 in which
   said counter comprises a mechanical counter having an external actuating member engaged by movement of said piston to register the number of times that said ball valve is moved to an open position.

9. A check valve and injector according to claim 7 in which
   said counter is electrically actuated and includes a proximity switch supported in said hollow body in a position responding to movement of said piston.

10. A check valve and injector according to claim 1 in which
    a passageway interconnects said pump chamber and the outlet side of said valve body,
    said piston being sealed against leakage in and moveable longitudinally of said passageway and extending into said pump chamber, said interconnecting means comprising a valve follower positioned to engage and move with said ball valve, a hollow actuating rod positioned for longitudinal movement in said valve body having one end extending into said hollow piston and having a lost motion connection therwith and another end engaging said valve follower, and said rod and said piston being moveable together until movement of said piston is limited, said hollow rod opening into said piston at one end and into said valve body at the other end, and spring means positioned in said valve body urging said ball valve into closed position.

11. A check valve and injector according to claim 10 including a check valve controlling flow of fluid through said inlet into said pump chamber and preventing backflow therethrough.

12. A check valve and injector according to claim 10 in which said sealing means comprises a sleeve member fitting the end of said valve body adjacent said hollow body, a rubber plug positioned in said sleeve member and having an internal passage through which said rod extends, said rubber plug being sealed to said rod and to the inner surface of said sleeve and being positioned to compress said rod against said valve follower to perform the function of said spring means urging said ball valve to the closed position against said valve seat.

13. A check valve and injector according to claim 10 in which said sealing means comprises a sleeve member fitting said passageway, a rubber plug positioned in said sleeve member and having an internal passage through which said piston extends, said rubber plug being sealed to said piston and to the inner surface of said sleeve and being positioned to cause said piston to compress said rod against said valve follower to perform the function of said spring means urging said ball valve to the closed position against said valve seat.

14. A check valve and injector according to claim 10 in which said piston has an a small bore at one end, an enlarged bore at the other end, and an apertured disc closing said other end, said hollow rod extending through said disc aperture and having a washer secured on the end portion thereof, a spring positioned in said enlarged bore engaging said washer to hold the same against said disc, and said last named spring and washer comprising said lost motion connection between said rod and said piston.

15. A check valve and injector according to claim 10 including an adjustable stop member in said hollow body engagable with said piston to limit the extent of movement thereof to determine the amount of fluid pumped thereby.

16. A check valve and injector according to claim 15 in which said hollow body has a threaded outlet and sealing plug to permit fluid discharge outside said pump chamber ot a remote point, and said hollow piston is constructed to receive a sealing plug, and a sealing plug is provided, wherein movement of said piston by said ball valve is operable to pump fluid out of said pump chamber to said remote point.

* * * * *